United States Patent [19]

Maida

[11] 4,451,150

[45] May 29, 1984

[54] FILM TAKE-UP APPARATUS IN CAMERA USABLE TOGETHER WITH A FILM MAGAZINE DEVICE

[75] Inventor: Osamu Maida, Tokyo, Japan

[73] Assignee: Nippon Kogaku K.K., Tokyo, Japan

[21] Appl. No.: 360,683

[22] Filed: Mar. 22, 1982

[30] Foreign Application Priority Data

Mar. 27, 1981 [JP] Japan ................................. 56-44120

[51] Int. Cl.³ .............................................. G03B 1/18
[52] U.S. Cl. ............................................... 354/173.11
[58] Field of Search ....................................... 354/173

[56] References Cited

U.S. PATENT DOCUMENTS 3,927,413 12/1975 Kimura et al. ...................... 354/173
4,174,166 11/1979 Daitoku et al. ...................... 354/173

*Primary Examiner*—Russell E. Adams

*Attorney, Agent, or Firm*—Fitzpatrick, Cella, Harper & Scinto

[57] ABSTRACT

A photographing camera used with a film magazine device includes a film feed means and a first driving source for driving said feed means. The film magazine device includes means for taking up the film from said feed means and a second driving source for driving said take-up means the driving time required for said first driving source to feed a definite amount of film changes in accordance with a function as represented by a rectangular hyperbola relative to the output voltage of power supply means for said first and second driving sources. Apparatus for controlling said second driving source comprises drive control means for controlling the driving time of said second driving source so as to drive it for a time shorter than the driving time of said first one by a nearly constant time. The drive control means includes means for changing the driving time of said second driving source in approximation to a function as represented by another rectangular hyperbola.

7 Claims, 11 Drawing Figures

CURRENT SUPPLYING TIME TO M1

CURRENT SUPPLYING TIME TO M2

FILM TAKE-UP APPARATUS IN CAMERA USABLE TOGETHER WITH A FILM MAGAZINE DEVICE

BACKGROUND OF THE INVENTION

1. Field of the Invention

The present invention relates to a film take-up apparatus in electric cameras usable together with a film magazine device.

2. Description of the Prior Art

Electric cameras provided with a motor drive unit in which the motor is used to take up the film and charge the shutter are well known. Various improvements have been proposed in such electric camera. For example, U.S. Pat. No. 3,927,413 has proposed such type of electric camera in which the backside lid is removed from the camera and instead a long film strip magazine device is mounted thereon. This type of electric camera includes two driving motors, one in the motor drive unit and another in the magazine device. The first motor in the motor drive unit is used to rotate a sprocket within the camera thereby feeding the film. The second motor in the film magazine is used to rotate a film take-up spool within the magazine thereby taking up the film passed over the sprocket.

In the above mentioned type of electric camera using a long film strip magazine device, the film within the camera is moved forward mainly by the rotation of the take-up spool driven by the second motor. The sprocket performs primarily the function of limiting the amount of the film them moved.

It has been found that this known type of electric camera has the following drawback:

Since the sprocket and the spool are driven independently of each other by two separate motors respectively, there is produced an excessive residual tension in the film segment extending between the sprocket and the take-up spool after every film take-up operation. At the next shutter release, the balance of tension on the film segment is broken by an impact caused by the shutter releasing operation. As a result, the film is moved a little at the time of exposure, which results in a blurred image of the picture taken on the film. This is an important problem involved in the electric camera as disclosed in the above referred U.S. Pat. No. 3,927,413.

As a solution to the above problem, it has been proposed to stop the second motor a little before stopping the first motor at the end of every film take-up operation. Since the first motor for driving the sprocket is allowed to continue still rotating for a short time after the second motor for driving the film take-up spool in the long film strip magazine has been stopped, the film segment extending from the sprocket to the take-up spool after the completion of film take-up operation becomes slack and is kept in a slack state. Owing to this slack of film, the film can be released from the above mentioned undesirable action of the impact force at the next shutter releasing operation.

However, in the prior art camera mentioned above there is another problem of voltage variation of the power source for driving the motors. In the aforementioned patent specification this problem has already been discussed and a description has been made as to the manner of control of the driving motors when such voltage change occurs in the power source. The above patent publication indicates that it has been experimentally found that troubles caused by such change in voltage of the power source can be eliminated by establishing a determined relation between the change of source voltage and the current applying time to the second motor. According to the description, the determined relation required therefor is that the current applying time to the second motor should change linearly to the change of source voltage. This may be applicable to the case wherein the working voltage range is relatively narrow. But, it is not applicable to such case wherein the working voltage range is very broad. The reason for this is as follows:

The above conclusion described in the patent publication may be applicable to the voltage variable over a wide range provided that the current supplying time to the first motor for driving the sprocket changes linearly relative to the variation of the source voltage. However, as will be described in detail later, the current applying time to the first motor does not change linearly to the change of source voltage. In practice, it changes in an entirely different manner. The relation of the current supplying time to the change of source voltage is not linear but rather approximates a rectangular hyperbola. Therefore, the time of from stopping of the second motor to stopping of the first one is never constant relative to the change of source voltage. As the time interval between the stop time of the second motor and that of the first one is not constant, it is impossible to form a certain constant slack in the film segment between the take-up spool and the sprocket.

SUMMARY OF THE INVENTION

Accordingly, it is an object of the present invention to provide a film take-up apparatus adoptable in a long film strip magazine device which enables provision of a nearly constant slack in the film segment extending from the sprocket to the film take-up spool even when the source voltage is variable over a wide voltage range.

To attain the object according to the invention there is provided a novel arrangement of film take-up means for a long film strip magazine device in which the driving time of the take-up spool driving motor always follows the driving time of the sprocket driving motor controlled with respect to the possible variation of source voltage. With this arrangement according to the invention, the driving time of the spool driving motor is always shorter than that of the sprocket driving motor by a definite time which is almost constant against the variation of the power source voltage over a wide range so as to maintain the amount of film feeding constant against the variation of the source voltage.

Other and further objects, features and advantages of the invention will appear more fully from the following detailed description taken in connection with the accompanying drawings.

DESCRIPTION OF PREFERRED EMBODIMENTS

Figure 1:
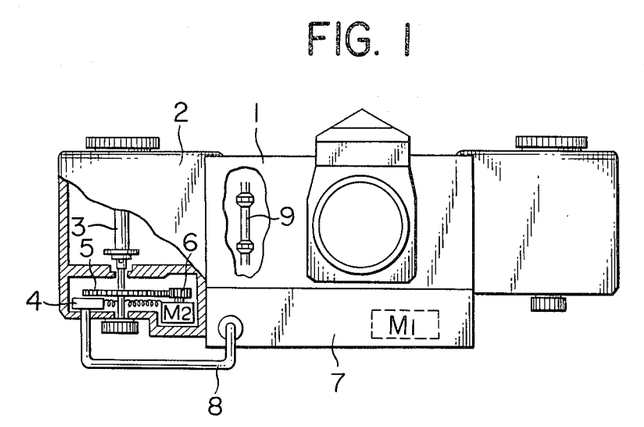
FIG. 1 is a front view of a electric camera having a long film strip magazine device mounted thereon showing an embodiment of the present invention.

Referring first to FIG. 1 there is shown a camera 1 having a long film strip magazine 2 mounted thereon according to the invention.

Within the magazine 2 there are provided a film take-up spool 3, a control circuit 4, a transmission gear array 5, 6 and a second motor $M_2$. The second motor $M_2$ is disposed to drive the take-up spool 3 through the transmission gear array 5, 6. The second motor $M_2$ is controlled by the control circuit 4 which is connected to a motor drive unit 7 through a connector 8. The motor drive unit 7 is electrically and machanically connected to the camera 1 through a connector and a coupling not shown. The motor drive unit 7 includes a first motor $M_1$ for driving a sprocket 9 into rotation as well as for shutter charge.

Figure 2:
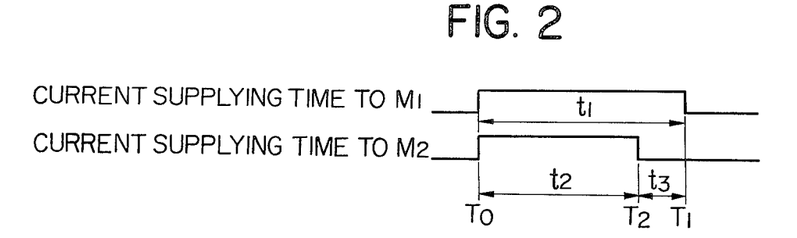
FIG. 2 is a time chart showing the current supplying times to the first and second motors.

To take up the film on the spool 3 stepwise, frame by frame, with picture-taking, electric current is applied to the first and second motors $M_1$ and $M_2$ in the manner shown in FIG. 2. As seen from FIG. 2, the current application to the first motor $M_1$ and that to the second motor $M_2$ are started at the same time point $T_0$. The current to the first motor $M_1$ is cut off at $T_1$. The current to the second motor $M_2$ is cut off to stop the rotation of the film take-up spool 3 at $T_2$ which is a little earlier than $T_1$. Thus, the current supplying time to $M_1$ ($t_1$) is a little longer than the current supplying time to $M_2$ ($t_2$). Time difference between $t_1$ and $t_2$ is $t_3$. Therefore, during the time difference $t_3$ there is formed a slack in the film segment extending from the spool to the sprocket.

Hereinafter, I will discuss the characteristic of the film take-up time of the first motor $M_1$ (current supplying time $t_1$) relative to the variation in voltage of the power source.

Assuming that the first motor $M_1$ takes up the film with the steady rotation of the motor $M_1$ at every source voltage, $$V = k_1 T + k_2 n \quad (1)$$

wherein,

V is source voltage;
T is loading torque of motor $M_1$;
n is revolutions per unit time of motor $M_1$;
$k_1$ and $k_2$ are constants determined by the motor $M_1$.

The film take-up time $t_1$ for the revolution number n determined by the above equation (1) is given by:

$$t_1 = (k_3/n) \quad (2)$$

wherein, $k_3$ is the revolution number of the motor $M_1$ required for film take-up, which is a constant determined by gear ratio and other given factors.

Rearrangement of equation (1) gives:

$$n = (V - k_1 T)/k_2 \quad (1)'$$

Substituting this equation (1)' in equation (2) gives:

$$t_1 = k_2 \cdot k_3/(V - k_1 T) \quad (3)$$

The loading torque of the first motor $M_1$, namely the torque T does work such as film charge at every step of one film take-up process and therefore, in practice, T varies momentarily. However, the variation is mere up-and-down around the average torque on the whole. Moreover, the torque T is little influenced by the kind of film then used. Therefore, as a whole, the torque T may be considered to be substantially constant. This alters equation (3) to:

$$t_1 = 1/(VK_1 - K_2) \quad (4)$$

wherein, $K_1$ and $K_2$ are constants which are represented by $K_1 = (1/k_2 \cdot k_3)$ and $K_2 = k_1/(k_2 \cdot k_3)T$, respectively.

In the above equation, $VK_1$ is a term proportional to the power source voltage and $K_2$ is a constant term independent of the variation of source voltage. As will be understood form the equation (4), the change of film take-up time $t_1$ relative to the source voltage V approximates the formula of a rectangular hyperbola. Strictly speaking, the formula should have a term of transient response owing to the inertial system. However, the transient response may be neglected in this case. The reason for this is that since the transient response at the starting time and that at the stopping time act in such manner as to cancel each other, the voltage change during the transient time is generally very small as compared with the voltage change during the total take-up time. Therefore, the term of transient can not have any substantial influence on the take-up time $t_1$. In approximation, the relation of the take-up time $t_1$ to the variation of source voltage can be well represented by the above formula (4) over a wide voltage range. For this reason, we omit the term of transient response in describing our invention.

Figure 3:
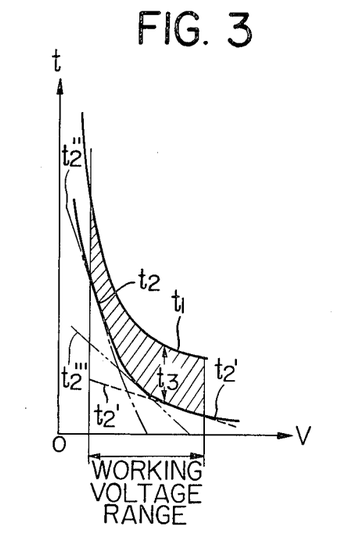
FIG. 3 is a graph showing the relation between source voltage and current supplying time to the motors.

The change of time $t_1$ according to the equation (4) is shown in FIG. 3.

As previously shown in FIG. 2, the current supplying time to the second motor $M_2$ in the film magazine, that is, the time $t_2$ has to be shorter than the current supplying time $t_1$ to the first motor $M_1$ determined according to the equation (4). The time difference $t_3$ between $t_1$ and $t_2$ should be selected to form an optimum amount of slack in the film. If the time difference $t_3$ is too small, then the film can not be released from the tension. On the contrary, if $t_3$ is too large, then the film has an excess slack and bends into a space out of the film running path whereby the normal film take-up is disturbed. In order always to provide constant slack in the film, therefore, the time difference $t_3$ should be controlled in such manner as to keep $t_3$ constant irrespective of change of the film take-up time with change of the source voltage. In FIG. 3, there is also shown the characteristic of the current supplying time $t_2$ to the second motor $M_2$ obtained when the time difference $t_3$ is kept constant relative to the film take-up time controlled in accordance with the above formula (4).

Figure 4:
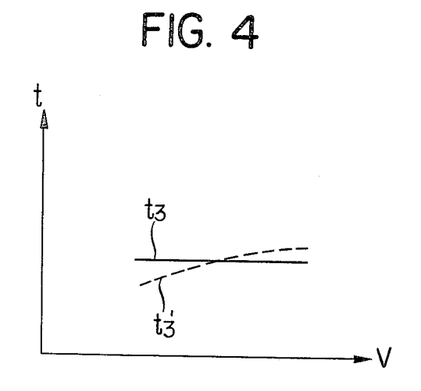
FIG. 4 is a graph showing the relation between source voltage and time difference in ending the current application.

FIG. 4 shows the change of time difference $t_3$ relative to the voltage V. It is preferable that the time difference should have such characteristic as suggested by curve $t'_3$ in FIG. 4 wherein the time slightly increases with increasing of the voltage. The reason for this is that the initial rotational speed of the motor at the application of braking to it increases with rising of the voltage and a longer time is required until the motor stops rotating. To compensate for this, when the voltage is high, the brake should be applied to the second motor $M_2$ in the film magazine preferably at an earlier time point than that when the voltage is low. By doing so, a better result may be obtained. However, such change in time required for this purpose is very small and therefore I will describe my invention saying that the time difference $t_3$ should be controlled to keep it nearly constant.

As previously mentioned, U.S. Pat. No. 3,927,413 has described that a satisfactory result of time control can be attained by changing the current supplying time $t_2$ linearly relative to the change of source voltage. However, if $t_2$ is changed linearly according to the prior art, then $t_3$ varies greatly because the film take-up time $t_1$ changes in the fashion of a rectangular hyperbola according to the relation formula (4). This will be described in detail with reference to FIG. 3.

In FIG. 3, three broken straight lines $t'_2$, $t''_2$ and $t'''_2$ show the manner of time control according to the above mentioned prior art for three different cases. A problem arises when the working voltage range is relatively broad. In the case of $t'_2$, the time difference $t_3$ becomes too large at the low voltage side of the working voltage range although an optimum control of $t_3$ may be attained at the high voltage side. In the case of $t''_2$ an optimum control can be attained at the low voltage side. However, $t_3$ becomes excessively large at the high voltage side. In the case of $t'''_2$ wherein the current applying time to the second motor is linearly controlled so as to obtain an optimum value of $t_3$ at the middle of the working voltage range, $t_3$ becomes too large at both the high voltage side and the low voltage side.

As seen from the above, it is impossible always to form a constant amount of slack in the film according to the linear control method proposed by the prior invention. The amount of slack formed in the film varies case by case. This is not only adverse to good and stable picture-taking but also to normal film take-up.

Figures 5, 5B:
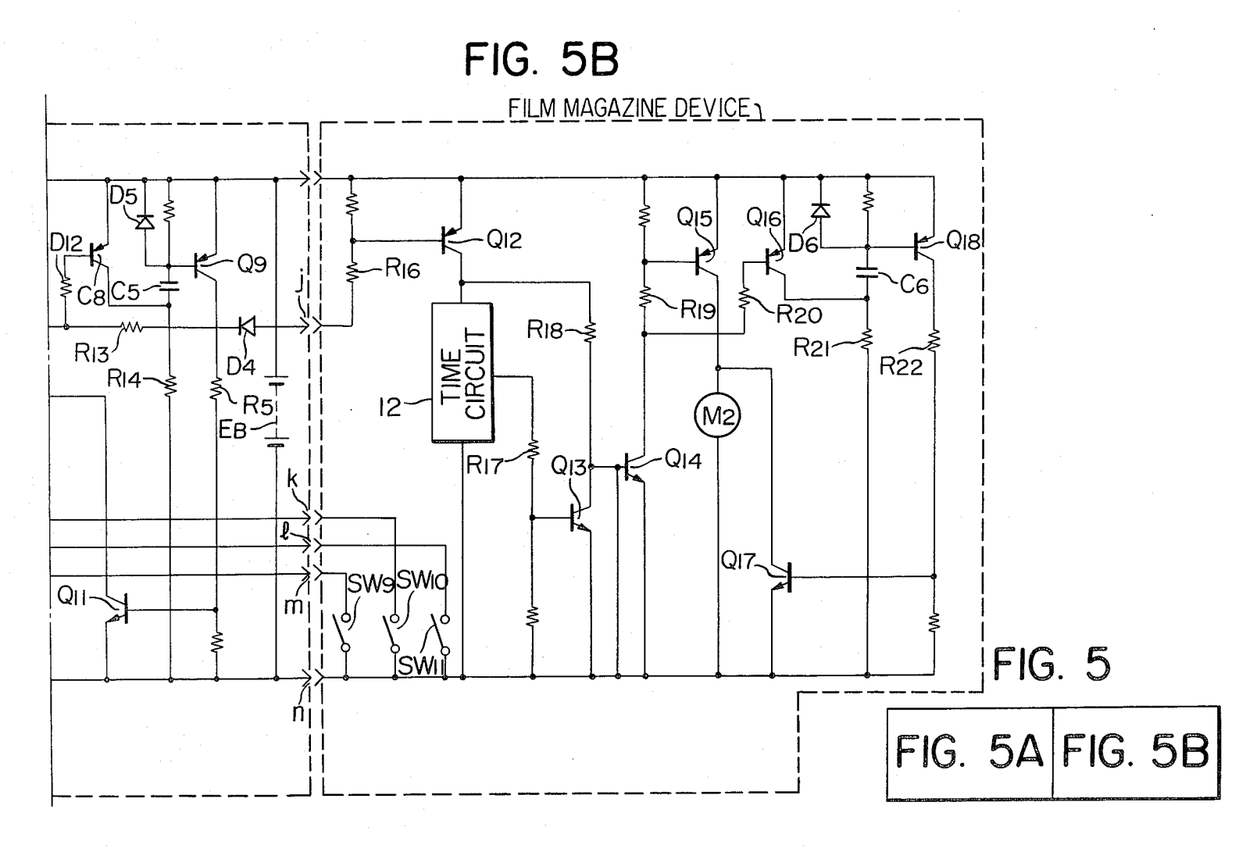
FIG. 5 composed of FIGS. 5A and 5B, is a circuit diagram of the whole system including a camera and a motor drive unit and a film magazine device mounted on the camera.
Figure 5A:
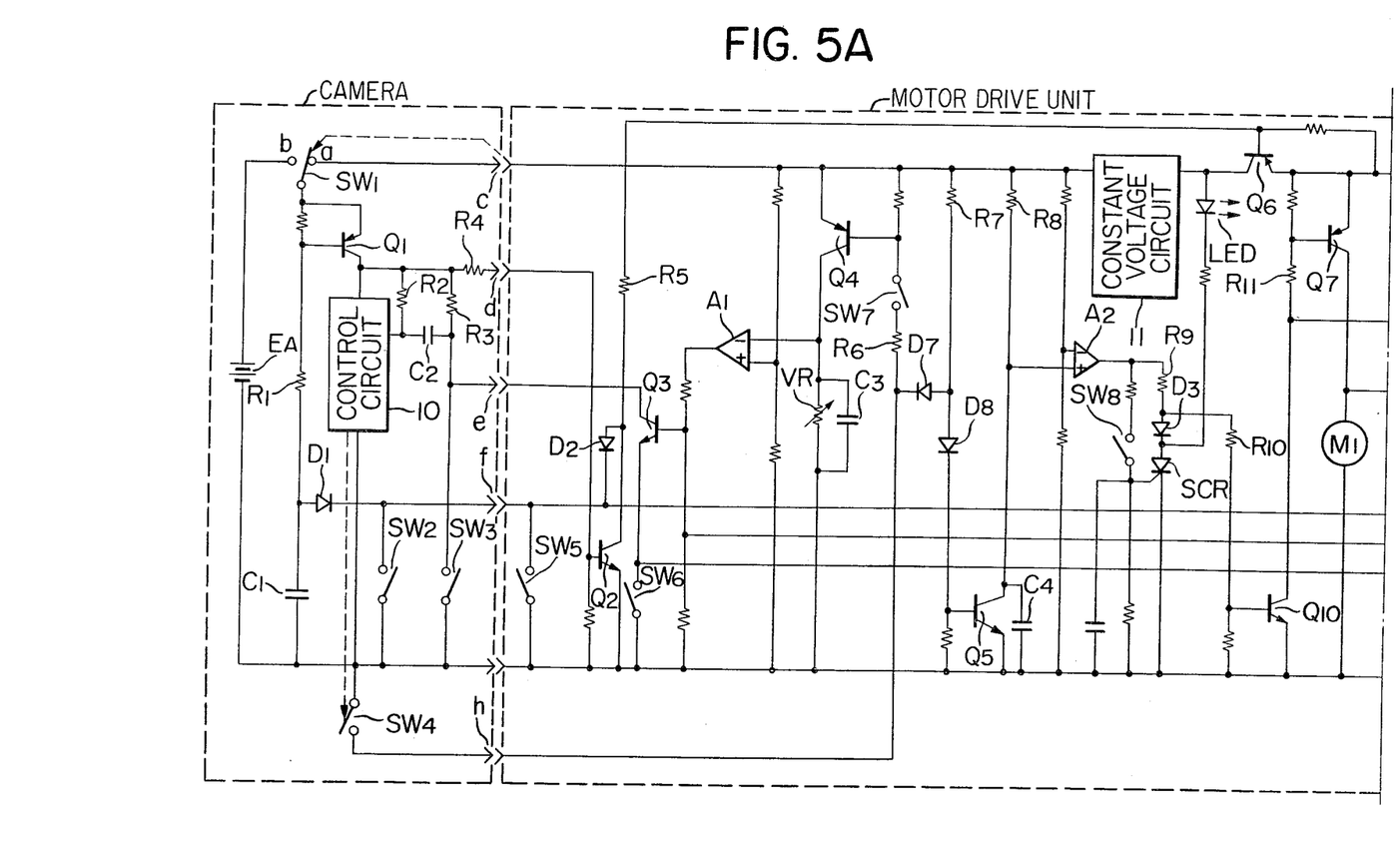

FIG. 5 shows electric circuits of a camera, a motor drive unit and a long film strip magazine device according to the invention and also the mutual relation of connection therebetween.

The circuit within the camera includes a power source changeover switch $SW_1$ which is operable interlocking with the connection to the motor drive unit. The circuit of the camera receives electric power from a power source EA in the camera or from a constant voltage circuit 11 in the motor drive unit selectively through the power source change-over switch $SW_1$. Transistor $Q_1$, resistor $R_1$ and capacitor $C_1$ constitute together a power source timer. Interlocking with a shutter button not shown, a power source switch $SW_2$ is turned ON to turn a transistor $Q_6$ ON through connector terminal f, diode $D_2$ and resistor $R_5$. With turn-ON of this transistor $Q_6$ the constant voltage circuit 11 is brought into operation by a power source EB in the motor drive unit. Therefore, the constant voltage circuit 11 supplies power to the circuit of the motor drive unit and also to the camera's circuit through a connector terminal c so that the power is supplied to a control circuit 10 which functions to control electromagnetic release and to control exposure.

During the time of switch $SW_2$ being ON, the base of transistor $Q_1$ is biased through $D_1$ and therefore it becomes ON. This state of ON of transistor Q is transmitted to the motor drive unit through resistor $R_4$ and connector terminal d thereby turning transistor $Q_2$ ON. With ON of the power source switch $SW_2$, the capacitor $C_1$ is discharged through backflow inhibiting diode $D_1$. This discharge current to the capacitor C holds the transistor $Q_1$ in the state of ON even after OFF of the power source switch $SW_2$. After a definite time determined by $C_1$, $R_1$ the transistor $Q_1$ becomes OFF. Therefore, at this time point, the transistor $Q_2$ is also turned OFF. Thus, the power supply to the whole system is stopped.

$SW_3$ is a release switch in link with the shutter button. Resistors $R_2$, $R_3$ and capacitor $C_2$ constitute a differentiation circuit. Through the differentiation circuit a signal informing of ON of switch $SW_3$ is introduced into the control circuit 10. $SW_4$ is a film take-up switch which is OFF when the camera is in the position after completing the film take-up and becomes ON immediately after the exposure is completed and the shutter is closed. ON of the switch $SW_4$ is maintained until the film take-up is completed. The state of take-up switch $SW_4$ is transmitted to the motor drive unit through a connector terminal h.

$SW_5$ in the motor drive unit is a power source switch which is turned ON interlocking with a shutter button not shown. This power source switch $SW_5$ is parallel-connected to the above mentioned power source switch $SW_2$ through the connector terminal f. $SW_6$ is a release switch interlocked with a shutter button (not shown) in the motor drive unit. $SW_7$ is a selection switch for selecting one frame picture-taking or continuous picture-taking. For one frame picture-taking, the switch $SW_7$ is OFF and for continuous picture-taking it is ON.

Comparator $A_1$, transistors $Q_3$, $Q_4$, variable resistor VR and capacitor $C_3$ constitute together a release timing circuit. When the continuous picture-taking mode is selected, this release timing circuit delays the time from the completion of a film take-up to the next shutter release so as to prevent the shutter from being released before the film has completely stopped after taking up the film. The release timing circuit allows change of the frame feeding speed in continuous photographing by selecting any desired delay time using the variable resistor VR.

Resistors $R_7$, $R_8$, diodes $D_7$, $D_8$, $D_3$, capacitor $C_4$, transistor $Q_5$ and comparator $A_2$ constitute a film take-up timing circuit. The function of this timing circuit is to prevent a premature start of film take-up operation. If the take-up switch $SW_4$ were turned ON simultaneously with the start of running of the shutter closing blade, the motor would be driven to start the film take-up operation even though the shutter is still open. The film take-up timing circuit is provided to prevent it. Therefore, this timing circuit may be omitted for such type of apparatus in which the take-up switch $SW_4$ is turned ON only after the shutter has completely closed.

$SW_8$ is a torque detection switch operable in response to a torque detection mechanism for detecting abnormal increase of film take-up load during the time of the take-up switch being ON, that is, during the time of the output of the comparator $A_2$ being at high level. When the film ends up and the film can no longer be drawn out from the film supply spool or when there is occurring any trouble in the mechanical part of the camera, the film take-up load will abnormally increase. The torque detection mechanism detects to and applies a detection signal to the torque detection switch $SW_8$. In response to the signal, the switch $SW_8$ becomes ON to trigger a thyristor SCR into ON by which the motor $M_1$ is stopped even when a take-up signal is being applied to it at the time. Also, the thyristor drives a display element LED for film end display through a resistor. Thus, the display element LED lights to indicate the occurred state.

Transistors $Q_7$, $Q_8$, $Q_9$, $Q_{10}$, $Q_{11}$, resistors $R_{11}$, $R_{12}$, $R_{14}$, $R_{15}$, capacitor $C_5$ and discharging diode $D_5$ constitute a motor driving circuit for motor $M_1$. When the transistor $Q_{10}$ is ON, transistors $Q_7$ and $Q_8$ are ON and $Q_9$ and $Q_{11}$ are OFF so that the motor is driven. When the transistor $Q_{10}$ is turned OFF, transistors $Q_7$ and $Q_8$ become OFF and transistors $Q_9$ and $Q_{11}$ become ON a certain time long determined by resistor $R_{14}$ and capacitor $C_5$ to apply an electromagnetic brake to the motor $M_1$ for quick stop. The motor $M_1$ is operationally connected with the film take-up mechanism in the camera through a reduction system and a power transmission system not shown. The motor drive unit and the film magazine device are electrically connected to each other through connector terminals i to n. Information of whether transistor $Q_{10}$ is ON or OFF, that is to say, whether the motor $M_1$ is in operation or not, is transmitted to the film magazine device through resistor $R_{13}$, backflow inhibiting diode $D_4$ and connector terminal j.

A release switch $SW_9$ is interlocked with a shutter button (not shown) provided on the film magazine device. Through the connector terminal m the release switch $SW_9$ is connected in parallel to the release switch $SW_6$ of the motor drive unit. Like the release switch $SW_9$, a power source switch $SW_{10}$ is connected in parallel to the power source switch $SW_5$ through connector terminal m. The power source switch $SW_{10}$ is turned ON interlocking with the motion of the not shown shutter button provided on the film magazine device.

$SW_{11}$ is a switch which is turned ON in response to count-over of a preset number of film frames counted by a counter not shown. By turn-ON of this switch $SW_{11}$ the base terminal of transistor $Q_3$ is short-circuited through connector terminal l so as to inhibit generation of a release signal. Thus, the photographing operation is stopped.

Transistor $Q_{12}$ turns transistor $Q_{14}$ ON through resistor $R_{18}$ and also supplies current to a time control circuit 12 depending on voltage when the transistor $Q_{10}$ is turned ON. When the current is applied to the timer circuit 12 by turn-ON of the transistor $Q_{12}$ the output from the circuit 12 becomes high level prior to OFF of $Q_{12}$. The high level output of the time control circuit 12 turns transistor $Q_{13}$ ON and $Q_{14}$ OFF through $R_{17}$.

Transistors $Q_{15}$, $Q_{16}$, $Q_{17}$, $Q_{18}$, resistors $R_{19}$, $R_{20}$, $R_{21}$, $R_{22}$, capacitor $C_6$ and discharging diode $D_6$ constitute a motor driving circuit for motor $M_2$. When $Q_{14}$ is ON, $Q_{15}$ and $Q_{16}$ are ON and $Q_{18}$ and $Q_{17}$ are OFF so that the motor $M_2$ is driven. When the transistor $Q_{14}$ is turned OFF, $Q_{15}$ and $Q_{16}$ become OFF and $Q_{17}$ and $Q_{18}$ become ON a certain time long determined by $R_{21}$ and $C_6$ so that an electromagnetic brake is applied to the motor $M_2$ to stop it quickly. As previously mentioned, the motor $M_2$ drives the film take-up spool 3 in the film magazine device through the gear array 5, 6 etc. shown in FIG. 1.

To terminate the current application to the motor $M_2$ at a time point earlier than the motor $M_1$ by a time difference $t_3$ with respect to the current supplying time $t_1$, the time control circuit 12 produces a high level output. In other words, the function of the time control circuit 12 is to count a most suitable current supplying time $t_2$ to the second motor $M_2$ relative to the voltage variation of power source.

I experimentally conducted calculations of the optimum current supplying time $t_2$ to the motor $M_2$ in the system of a given apparatus. The results were as follows:

Optimum current supplying time $t_2$ obtained taking into account the above mentioned term of transient response in the inertial system and the necessary control factor of $t_3$ depending on voltage:

52 ms. for 20 V (Source voltage); 58.3 ms. for 18 V; 72.5 ms. for 15 V; 96.3 ms. for 12 V; 114.3 ms. for 10.5 V and 142 ms. for 9 V.

From these data, a rectangular hyperbolic function as the above functional formula (4), namely $t=1/VK_1-K_2$ is found to which the data can be approximated.

Let $(T_0, V_0)$, $(T_1, V_1)$ be two points on which the rectangular hyperbola passes. Then, $$T_0 = 1/(V_0 K_1 - K_2) \tag{5}$$

$$T_1 = 1/(V_1 K_1 - K_2) \tag{6}$$

From equation (5), $$T_0 V_0 K_1 - T_0 K_2 = 1 \tag{5'}$$

From equation (6), $$T_1 V_1 K_1 - T_1 K_2 = 1 \tag{6'}$$

From above (5)' and (6)', $$T_0 V_0 K_1 - T_0 K_2 = T_1 V_1 K_1 - T_1 K_2$$

$$\therefore K_1 = \frac{K_2(T_0 - T_1)}{(T_0 V_0 - T_1 V_1)} \tag{7}$$

Substituting this equation (7) in the above (4) gives:

$$t = \frac{1}{K_2 \left( V \frac{T_0 - T_1}{T_0 V_0 - T_1 V_1} - 1 \right)} \tag{8}$$

From (8) the aimed rectangular hyperbola can be defined by determining a third point on which the rectangular hyperbola passes.

Let $(T_2, V_2)$ be the third point. Then, from (8)

$$K_2 = \frac{1}{T_2 \left( \frac{V_2(T_0 - T_1)}{T_0 V_0 - T_1 V_1} - 1 \right)} \tag{9}$$

Thus, $K_1$ and $K_2$ are determined from (7) and (9).

To define the rectangular hyperbola, the above optimum values are used as the three points on the rectangular hyperbola as follows:

($T_0 = 0.052$ s., $V_0 = 20$ V)

($T_1=0.142$ s., $V_1=9$ V)

($T_2=0.0725$ s., $V_2=15$ V)

From (9), $$K_2=2.9521 \text{ 1/sec}$$

From (7), $$K_1=1.1163 \text{ 1/V.sec}$$

Therefore, the determined rectangular hyperbolic function is:

$$t = \frac{1}{1.1163V - 2.9521} \quad (10)$$

Using the above formula (10) the required current supplying times for other voltages than the above three points used to determine the functional formual (10) are obtained, which are as follows:

|  | Values calculated according to the equation (10) | Optimum values described above |
|---|---|---|
| For 18V | t = 0.0583 sec | 0.0583 sec |
| For 12V | t = 0.0958 sec | 0.0963 sec |
| For 10.5V | t = 0.1140 sec | 0.1143 sec |

From the above it is obvious that the determined rectangular hyperbolic formula (10) is a very close approximation to the above optimum values experimentally found.

The time control circuit 12 shown in FIG. 5 is so formed as to have such control characteristic of time to voltage approximate to the rectangular hyperbolic characteristic represented by the above formula (10). Hereinafter, some embodiments of the time control circuit 12 will be described in detail with reference to FIGS. 6 to 9.

Figure 6:
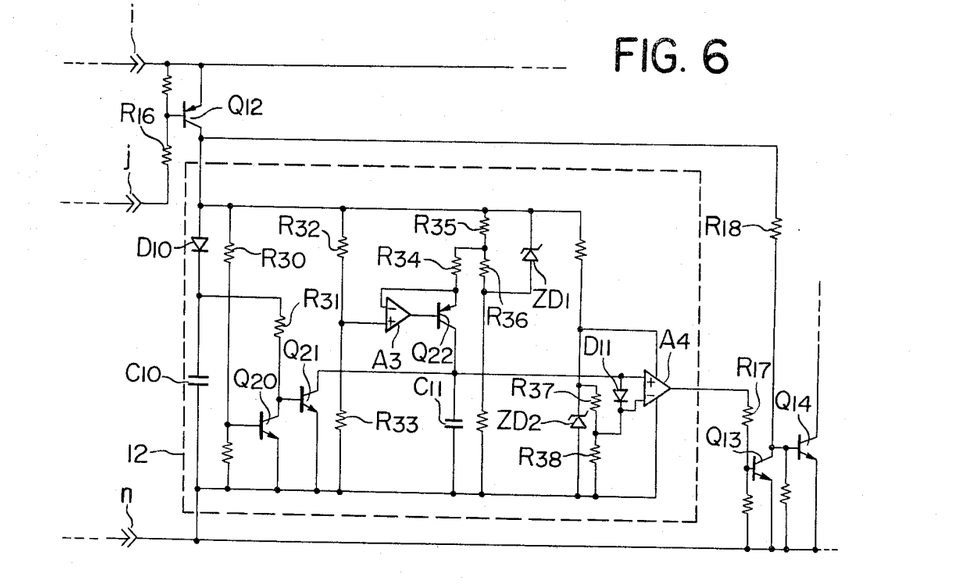
FIG. 6 is a circuit diagram of an embodiment of the time control circuit according to the invention.

FIG. 6 shows the first embodiment of time control circuit 12. With this embodiment, the relation of rectangular hyperbola (10) can be realized as it is.

In the time control circuit 12 shown in FIG. 6, resistors $R_{32}$-$R_{38}$, capacitor $C_{11}$, transistor $Q_{22}$, operational amplifier $A_3$, Zener diodes $ZD_1$, $ZD_2$, diode $D_{11}$ and comparator $A_4$ constitute a timer whose output changes in a rectangular hyperbolic characteristic. Resistors $R_{30}$, $R_{31}$, capacitor $C_{10}$, backflow inhibiting diode $D_{10}$ and transistors $Q_{20}$ and $Q_{21}$ constitute a resetting circuit for charge capacitor $C_{11}$.

Information of start of driving the motor $M_1$ in the motor drive unit is transmitted to the transistor $Q_{12}$ through connector terminal j to turn the transistor ON. By turn-ON of this transistor $Q_{12}$ the power supply to the time control circuit 12 is started. When the transistor $Q_{12}$ is turned ON, transistor $Q_{20}$ also becomes ON. Therefore, the transistor $Q_{21}$ parallel-connected to the charge capacitor $C_{11}$ is held in the state of OFF. Simultaneously with the start of power supply to the time control circuit 12 by ON of transistor $Q_{12}$, the capacitor $C_{11}$ is charged with the collector current of transistor $Q_{22}$. The charged voltage on the capacitor $C_{11}$ is compared with a determined voltage by Zener diode $ZD_2$ in the comparator $A_4$. At the moment when the charged voltage exceeds the determined voltage, the comparator $A_4$ produces a high level output. Let $V_{ZD1}$ denote the voltage determined by Zener diode $ZD_1$. The relation between the collector current of transistor $Q_{22}$, ic and the voltage of power source, V is given by:

$$ic = \left( V \frac{R_{32}}{R_{32}+R_{33}} - V_{ZD1} \frac{R_{35}}{R_{35}+R_{36}} \right) \frac{1}{R_{34}} \quad (11)$$

provided that hFE of the transistor $Q_{22}$ is sufficiently high and its collector current ic is sufficiently small as compared with the current flowing into registors $R_{35}$ and $R_{36}$ owing to the voltage generated by Zener diode $ZD_1$.

After starting the motor $M_2$ by ON of transistors $Q_{12}$ and $Q_{14}$, the current application to the motor $M_2$ continues until the output of the comparator $A_4$ changed from low level to high. By the high level output of the comparator $A_4$ the transistor $Q_{13}$ is turned ON and the transistor $Q_{14}$ is turned OFF. Thus, the current to the motor $M_2$ is cut off. The time t from the start of the motor $M_2$ to the cut-off of the current application to $M_2$ is given by:

$$t = \frac{1}{V \frac{\alpha_1}{C_{11}V_{ZD2}\alpha_3 R_{34}} - \frac{V_{ZD1}\alpha_2}{C_{11}V_{ZD2}\alpha_3 R_{34}}} \quad (12)$$

wherein, $V_{ZD2}$ is the voltage of Zener diode $ZD_2$;

$$\alpha_1 = \frac{R_{32}}{R_{32}+R_{33}}$$

$$\alpha_2 = \frac{R_{35}}{R_{35}+R_{36}}$$

$$\alpha_3 = \frac{R_{38}}{R_{37}+R_{38}}$$

To make equation (12) equal to above (10) the following circuit constants are selected:

$\alpha_1=0.279$, $\alpha_2=0.1475$, $\alpha_3=0.5$, $V_{ZD1}=V_{ZD2}=5$ V, $C_{11}=1$ μF and $R_{34}=100$ KΩ.

The value of t corresponds to $t_2$ in FIG. 2 and is shorter than the current supplying time to the motor $M_1$ transmitted through connector terminal j, that is, current supplying time $t_1$. The difference between t and $t_1$ is almost constant because the values used to specify the above functional formula (10) have been determined taking into consideration a nearly constant time difference $t_3$ relative to $t_1$.

At the time when the current application to the motor $M_1$ is stopped, transistor $Q_{12}$ is turned OFF and also transistor $Q_{20}$ is OFF. Therefore, transistor $Q_{21}$ becomes ON for a determined time by capacitor $C_{10}$ to discharge the capacitor $C_{11}$. Thus, the control circuit is prepared for the next control operation.

Figure 7:
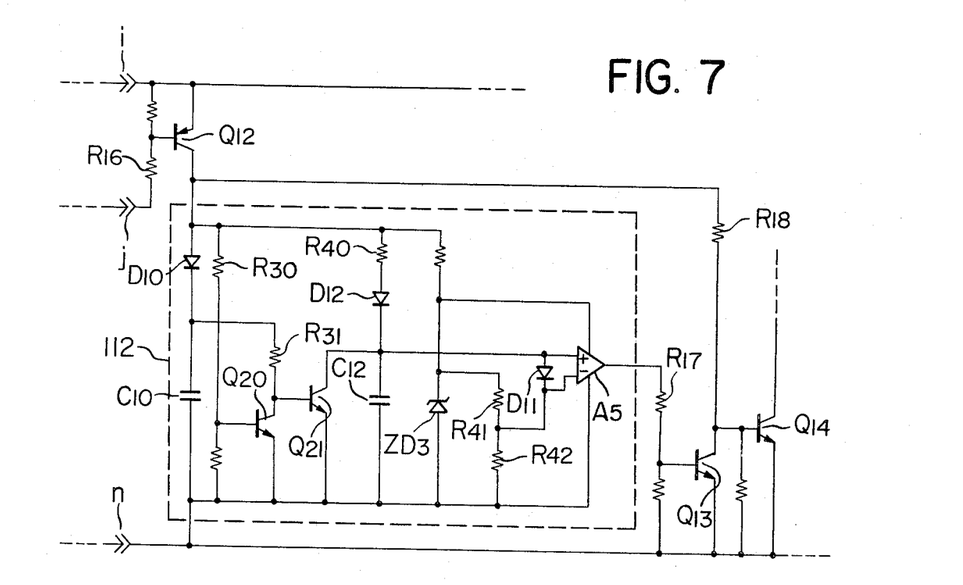
FIG. 7 is a circuit diagram similar to FIG. 6 showing a second embodiment of the time control circuit.

FIG. 7 shows the second embodiment of the time control circuit. In the first embodiment shown in FIG. 6, the time control has been carried out in such manner that the relation of time t to voltage V becomes a rectangular hyperbolic function. In contrast, in the second embodiment shown in FIG. 7, the time control is carried out in such manner that the relation of time t to voltage is approximated to a logarithmic function.

In FIG. 7, like reference symbols to FIG. 6 represent the same and corresponding elements.

In the time control circuit 112 shown in FIG. 7, the transistor $Q_{12}$ is turned ON and the capacitor $C_{12}$ is charged through resistor $R_{40}$ and diode $D_{12}$ when the current application to the motor $M_1$ is started. Since the forward voltage of the diode $D_{12}$ may be considered to be almost constant relative to the change of current, the voltage is denoted by $V_{D12}$ hereinunder. The inversion input voltage off the comparator $A_5$ is denoted by Vs. Time $\underline{t}$ is defined as a time passed from turn-ON of transistor $Q_{12}$ to the time point at which the output of comparator $A_5$ changes from Low to High. In this embodiment, the relation of time t to source voltage V is given by:

$$t = C_{12}R_{40}\ln \frac{V - V_{D12}}{V - V_{D12} - V_s} \quad (13)$$

As above noted, $V_{D12}$ is not optional but a substantially fixed voltage value, which is about 0.65 V when there is used a silicon diode. Therefore, the above relation formula (13) of $\underline{t}$ to V can be specifically defined by determining the values of $C_{12} \cdot R_{40}$ and Vs.

To specialize the above function (13), two pairs of time $\underline{t}$ and voltage V have to be selected.

Let $(T_1, V_1)$ and $(T_2, V_2)$ be two points on which the curve of the function (13) passes. Then, $$T_1 = C_{12} \cdot R_{40}\ln \frac{V_1 - V_{D12}}{V_1 - V_{D12} - V_s} \quad (14)$$

$$T_2 = C_{12} \cdot R_{40}\ln \frac{V_2 - V_{D12}}{V_2 - V_{D12} - V_s} \quad (15)$$

From above (14) and (15), the ratio $(T_1/T_2)$ is given below:

$$\frac{T_1}{T_2} = \frac{\ln \frac{V_1 - V_{D12}}{V_1 - V_{D12} - V_s}}{\ln \frac{V_2 - V_{D12}}{V_2 - V_{D12} - V_s}} \quad (16)$$

Rearrangement of equation (16) gives:

$$\left( \frac{V_2 - V_{D12}}{V_2 - V_{D12} - V_s} \right)^{T_1} - \left( \frac{V_1 - V_{D12}}{V_1 - V_{D12} - V_s} \right)^{T_2} = 0 \quad (17)$$

As $T_1, T_2, V_1, V_2, V_{D12}$ are all known values as optimum values, the value to be found out is only that Vs. Since the equation (17) has no algebraic solution, a numerical solution of Vs is found out using the known values of $V_{D12}=0.65$ V, ($V_1=20$ V, $t_1=0.052$ s), ($V_2=10.5$ V, $T_2=0.1143$ s). The found solution is:

$$V_s = 3.465 \text{ V} \quad (18)$$

From (18) and (14) the value of $C_{12} \cdot R_{40}$ can be obtained, which is:

$$C_{12} \cdot R_{40} = 0.2635 \text{ s} \quad (19)$$

From this equation (19), $R_{40}=263.5$ KΩ is obtained for $C_{12}=1$ μF. From equations (13), (18) and (19), $$t = 0.2635\ln \frac{V - 0.65}{V - 4.115} \quad (20)$$

Using this equation (20) the following values of t are obtained for V=18 V, 15 V, 12 V and 9 V respectively: t=58.7 ms, 72.8 ms, 96.0 ms and 141.3 ms.

From the above, it is understood that the values obtained in accordance with the rectangular hyperbolic function (10) can be tracked with fairly high preciseness also using the logarithmic function (20).

The function of diode $D_{12}$ is to prevent the charged voltage on capacitor $C_{12}$ from flowing into the base-emitter of transistor $Q_{20}$ through $R_{40}$ and $R_{30}$ when the transistor $Q_{12}$ is turned OFF. This prevents delay of discharging of capacitor $C_{12}$ and turn-ON of transistor $Q_{14}$ by discharge current through $R_{18}$. By suitably setting the values of $R_{30}$ and $R_{18}$ there is obtained also a solution wherein the diode $D_{12}$ becomes unnecessary. Even in such case, a similar good tracking preciseness to the above can be obtained by solving the equation (13) using $V_{D12}=0$.

Figure 8:
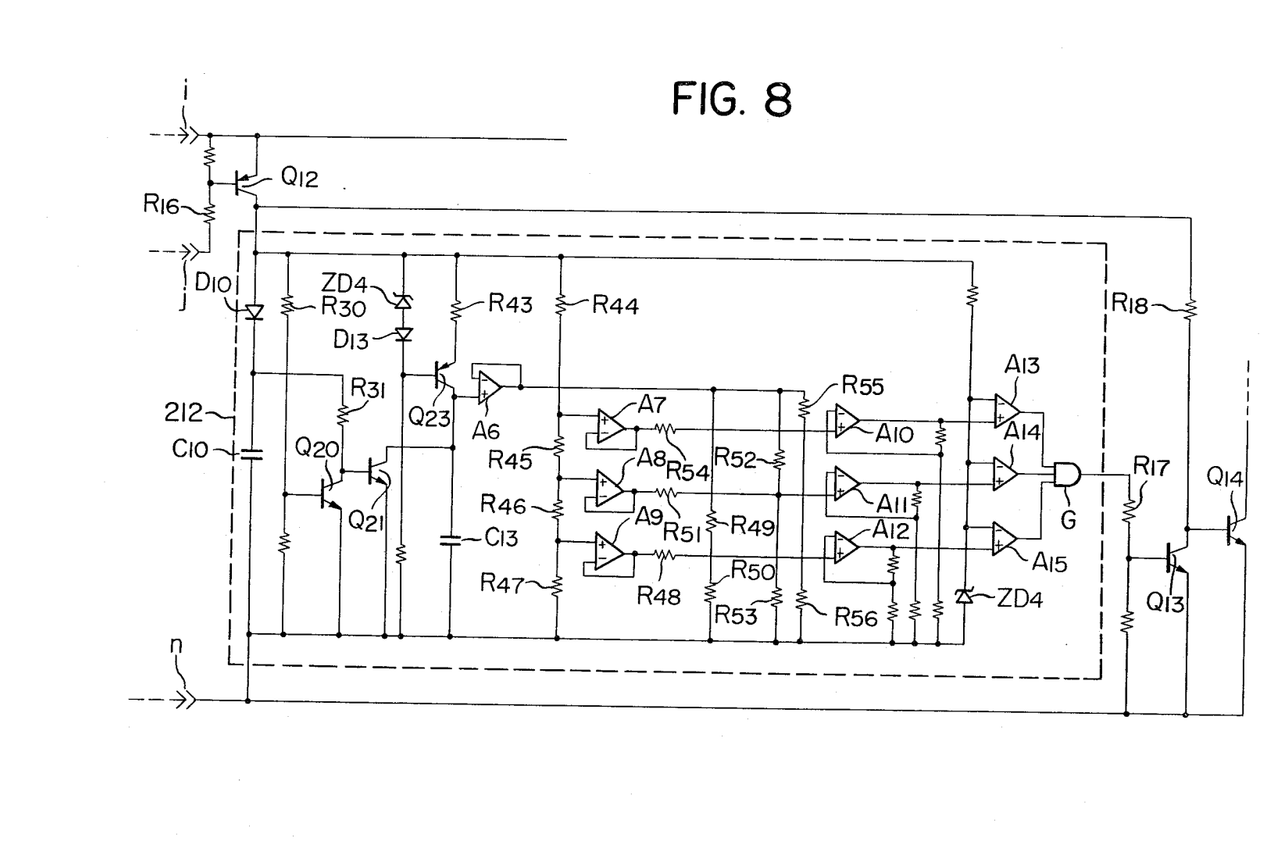
FIG. 8 shows a third embodiment of the time control circuit.

FIG. 8 shows the third embodiment of time control circuit 212 wherein the characteristics required by the relation (10) are tracked using a polygonal line function.

In the time control circuit 212 shown in FIG. 8, like symbols to FIG. 6 represent the same and functionally corresponding circuit elements.

In this embodiment, when the current application to the motor $M_1$ is started, transistor $Q_{12}$ is turned ON and the capacitor $C_{13}$ is charged with the collector current of transistor $Q_{23}$. The charged voltage is the output from the follower amplifier $A_6$. Let $i_{23}$ be the collector current of transistor $Q_{23}$ and $V_{A6}$ be the output voltage of amplifier $A_6$. Then, $$V_{A6} = (i_{23}t/C_{13}) \quad (21)$$

The power source voltage V is divided by resistors $R_{44}$–$R_{47}$. Let $\alpha_A$ be the voltage dividing ratio and $V_{A7}$ be the output voltage of follower amplifier $A_7$. Then, $$V_{A7} = \alpha_A V \quad (22)$$

For the sake of simplification of explanation, it is assumed that the resistances of $R_{54}, R_{55}$ and $R_{56}$ are all the same. Let Gain $A_{10}$ denote the amplification degree of in-phase amplifier $A_{10}$ and $V_{A10}$ the output voltage of the amplifier $A_{10}$. Then, $$V_{A10} = \frac{\text{Gain}A_{10}}{3} \left( \frac{i_{23}t}{C} + \alpha_A V \right) \quad (23)$$

Zener diode $ZD_4$ gives a comparison reference voltage $V_{ZD4}$ for comparator $A_{13}$. Let $t_A$ be the time passed from turn-ON of transistor $Q_{12}$ to the time point at which the output of comparator $A_{13}$ changes from Low to High. Then, from the above equation (23), $$t_A = \frac{C}{i_{23}} \left( 3 \frac{V_{ZD4}}{\text{Gain}A_{10}} - \alpha_A V \right) \quad (24)$$

Likewise, time $t_B$ required for comparator $A_{14}$ to change to High and time $t_C$ required for comparator $A_{15}$ to change to High are given by:

$$t_B = \frac{C}{i_{23}} \left( 3 \frac{V_{ZD4}}{\text{Gain}A_{11}} - \alpha_B V \right) \quad (25)$$

$$t_C = \frac{C}{i_{23}} \left( 3 \frac{V_{ZD4}}{\text{Gain}A_{12}} - \alpha_C V \right) \quad (26)$$

In the above, $\alpha_A > \alpha_B > \alpha_C$.

Figure 9:
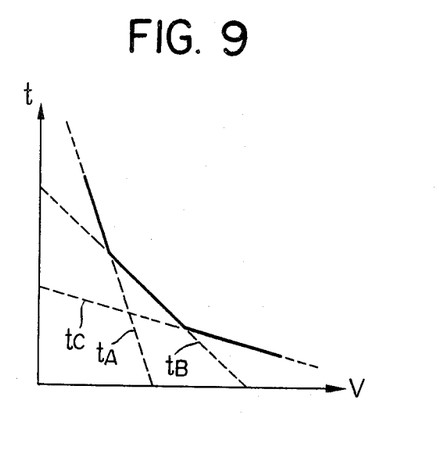
FIG. 9 is a graph showing the output from the third embodiment of time control circuit shown in FIG. 8.

G is an AND gate. Time required for its output to change from Low to High is determined by the longest control time among these three comparators $A_{13}$, $A_{14}$ and $A_{15}$. As seen from equations (24), (25) and (26), the changing rate of time to source voltage V becomes smaller and smaller in the sequence of $t_A$, $t_B$ and $t_C$. Further, the amount of parallel displacement is set by $\text{Gain}A_{10}$, $\text{Gain}A_{11}$ and $\text{Gain}A_{12}$. Thus, a relation curve in polygonal line $t_A - t_B - t_C$ is defined in which the line representing the longest time among three different times for respective voltages approximates the current supplying time $t_2$ shown in FIG. 3. FIG. 9 shows the relation of time to voltage in this embodiment. Dotted lines $t_A$, $t_B$ and $t_C$ represent the relations of time to voltage determined according to equations (24), (25) and (26). Solid polygonal line shows the time obtained by the output of AND gate G.

While the invention has been particularly shown and described with reference to preferred embodiments thereof, it will be understood by those skilled in the art that various changes and modifications may be made therein without departing from the scope and spirit of the invention in its broader aspects.

I claim:

1. In a photographing camera system comprising film feed means, a first driving source for driving said feed means, means for taking up film from said feed means, second driving means for driving said take-up means, power supply means for said first and second driving sources, means for connecting said first and second driving means to said power supply means at substantially the same time, and first control means for disconnecting said first driving source from said power supply means when a definite amount of said film has been fed by said feed means, the improvement comprising:

second control means for disconnecting said second driving source from said power supply means before said first driving source is disconnected from said power supply means;

said second control means including timer circuit means which generates an output upon elapse of a delay time changing in approximation to a function as represented by a rectangular hyperbola, relative to change in an output voltage of said power supply means, after said second driving source has been connected to said power supply means.

2. A photographing camera system according to claim 1, wherein said timer circuit means delay time is represented by the following formula:

$$1/(VK_1 - K_2)$$

where V represents the output voltage of said power supply means, and $K_1$ and $K_2$ are constants, respectively.

3. A photographing camera system according to claim 1, wherein said timer circuit means delay time changes in accordance with a logarithmic function approximated to said rectangular hyperbola, relative to change in the output voltage of said power supply means.

4. A photographing camera system according to claim 1, wherein said timer circuit means delay time changes in accordance with polygonal line function approximated to said rectangular hyperbola, relative to change in the output voltage of said power supply means.

5. A photographing camera system according to claim 1, wherein said timer circuit means includes a circuit for generating a current corresponding to an output voltage of said power supply means, capacitor means charged by the current from said current generating means in response to said connecting means, and a circuit for comparing a voltage generated by said capacitor means with a reference voltage.

6. A photographing camera system, according to claim 5, wherein said timer circuit means further includes a resistor circuit for controlling said charge voltage of said capacitor means in accordance with said rectangular hyperbola.

7. A photographing camera system according to claim 5, wherein said timer circuit means includes a resistor circuit for controlling said charge voltage of said capacitor means in accordance with a logarithmic function approximate to said rectangular hyperbola.

* * * * *

UNITED STATES PATENT AND TRADEMARK OFFICE
CERTIFICATE OF CORRECTION

PATENT NO. : 4,451,150
DATED : May 29, 1984
INVENTOR(S) : OSAMU MAIDA

It is certified that error appears in the above-identified patent and that said Letters Patent is hereby corrected as shown below:

```
Column 4, line 45, change "we" to --I--;
          line 46, change "our" to --my--.
Column 7, line3, change "to" to --this--.
Column 11, line 10, change "off" to --of--.
```

Signed and Sealed this

Second Day of October 1984

[SEAL]

*Attest:*

*Attesting Officer*

GERALD J. MOSSINGHOFF

*Commissioner of Patents and Trademarks*